July 18, 1944.　　　　　J. ROSAN　　　　2,353,851
TUBULAR INSERT
Filed Sept. 27, 1941　　　2 Sheets-Sheet 1
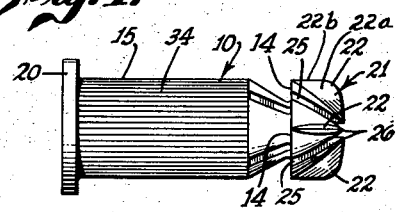
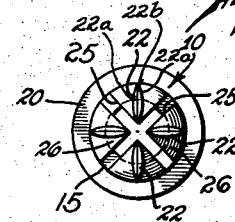
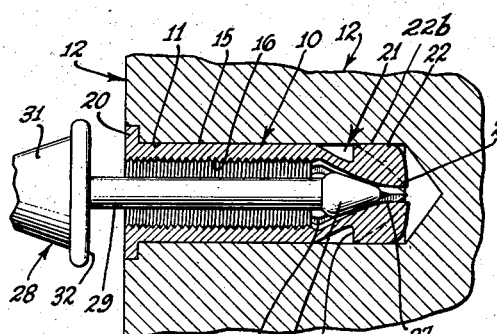
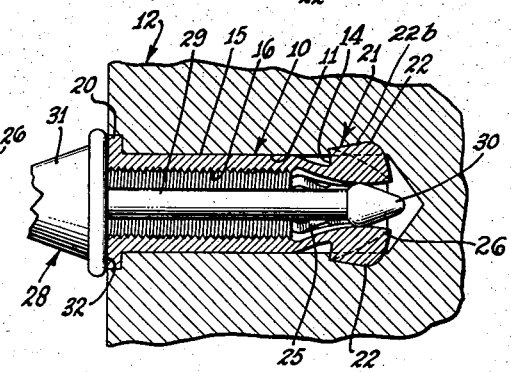
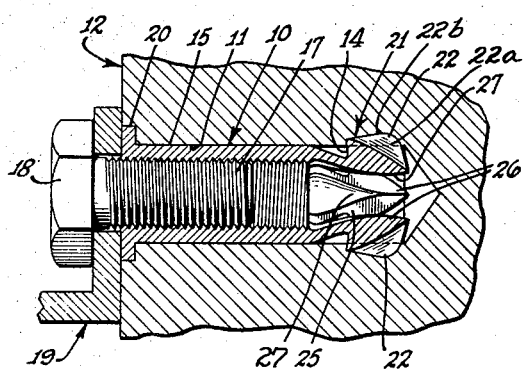
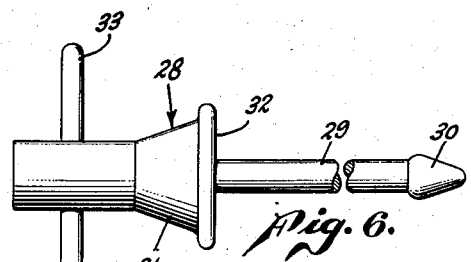
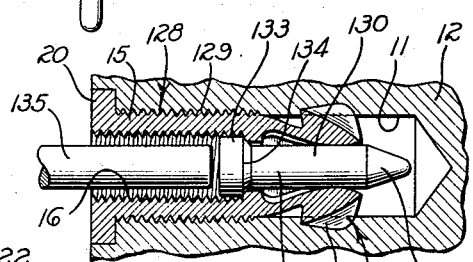
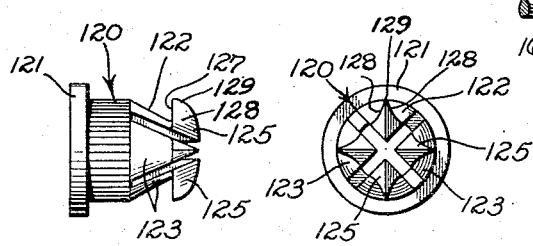
INVENTOR
JOSEPH ROSAN
BY
HARRIS, KIECH, FOSTER & HARRIS
Clarence F. Kiech
FOR THE FIRM
ATTORNEYS July 18, 1944.　　　　J. ROSAN　　　　2,353,851
TUBULAR INSERT
Filed Sept. 27, 1941　　　　2 Sheets-Sheet 2
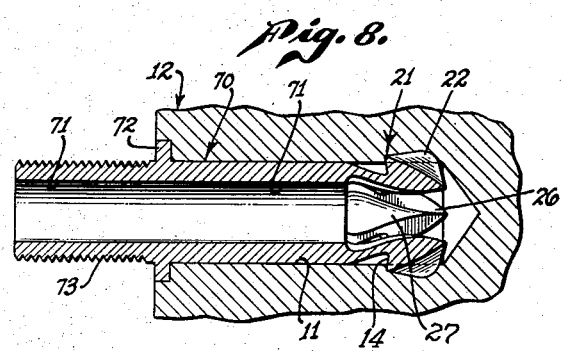
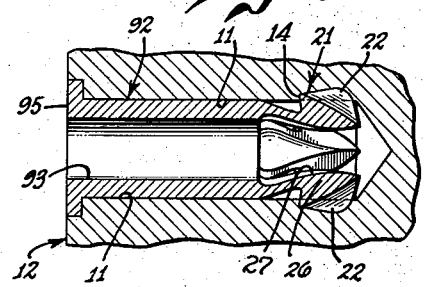
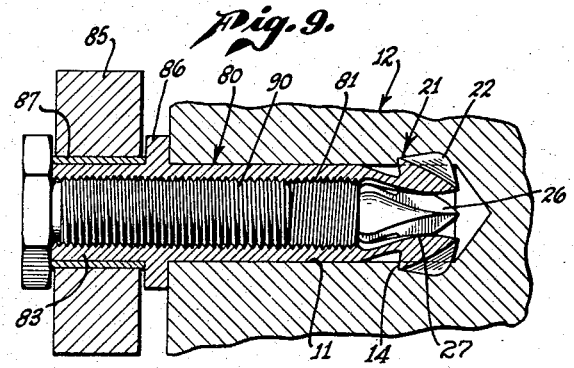
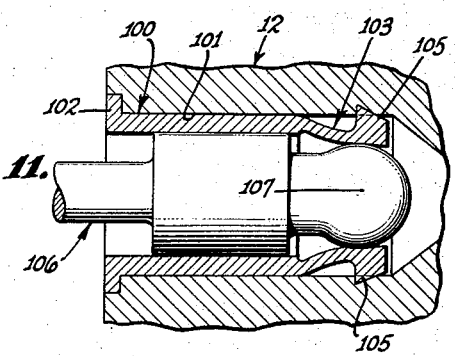
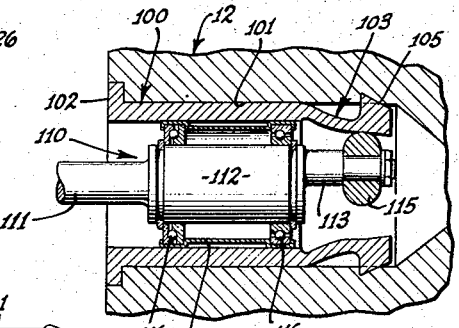
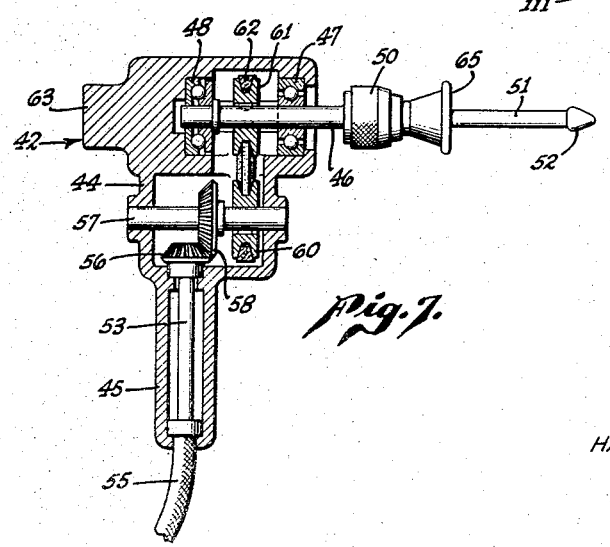
INVENTOR
JOSEPH ROSAN
BY
HARRIS, KIECH, FOSTER & HARRIS
FOR THE FIRM
ATTORNEYS Patented July 18, 1944

2,353,851

UNITED STATES PATENT OFFICE 2,353,851

TUBULAR INSERT

Joseph Rosan, North Hollywood, Calif.

Application September 27, 1941, Serial No. 412,583

7 Claims. (Cl. 85—2.4)

My invention relates to tubular inserts for mounting in the bores of bodies for various purposes including the function of attaching objects to the bodies. More particularly, the invention relates to the use of expansible tubular inserts and is directed both to the construction of an improved insert and the method of installing such an insert.

Many bodies are constructed of metal too soft or otherwise unsuited for effective penetration by nails or screws, and while such bodies can be bored, efficient screw threads cannot be cut into the walls of the bores for engagement by screws. Some of these materials include concrete, marble, soft metals and certain plastics. For attaching objects to such bodies many types of coupling devices and threaded inserts have been devised to fit into bores and expand into effective engagement with the walls of the bores.

One disadvantage encountered in many of the prior art devices is that special bores of expanded configuration are required for effecting positive engagement. Another disadvantage characteristic of some of the more efficient prior devices is that the screw employed with an insert actively cooperates in the function of gripping the bore walls and for that purpose must extend a given distance into the insert with very little tolerance. The degree to which a screw protrudes from the bore of a body is governed by the requirements of the object that is to be attached to the body, and, if the extent to which the screw extends into a bore is fixed, it becomes necessary to use screws of carefully selected lengths for efficient attachment of various objects.

One purpose of the present invention is to provide an expansible insert that may be employed in a highly effective manner in a common straight bore or in a straight threaded bore. Another object in mind is to provide an insert that does not require cooperation with the inserted screw to grip the walls of the bore and, therefore, will permit a given screw to be inserted to various depths for various attachment functions.

In some of the well known prior art combinations, the screw for attaching an object to a body has the additional function of serving as an expansion member, the screw being advanced by rotation in the insert and being adapted to deform, flex, or otherwise expand the insert. There is a limit to the force that can be applied through a screw, and the magnitude of the permissible force may not be adequate, especially if aggressive penetration of the bore walls by teeth on the insert is intended. A further object of my invention is to avoid straining screws in this manner and yet to achieve expansion force of any magnitude required for effective penetration of the bore walls by the insert. My novel concept in this regard is that a threaded insert bushing may be designed for expansion by a special tool prior to insertion of any attachment screw. In one practice of my invention, I employ an impact or percussion tool adapted to be struck by a hammer for applying expansion force to the interior of the threaded insert. In another procedure I employ a spinning expansion tool which may be adapted for impact, certain advantages inhering in the spinning operation. Further objects of the invention relate to the specific construction of such an insert and the specific construction of a tool for cooperation with the insert.

In one form of my insert the object is to provide a suitable anchored liner for a bore in a relatively soft body, the function of the bore being, for example, to receive a centering pin or to house a bearing for a rotatable member.

The above and other objects of my invention will be apparent in the detailed description to follow, taken with the accompanying drawings.

In the drawings which are to be considered as illustrative only:

Fig. 1 is a side elevation of one form of insert bushing constructed according to my invention;

Fig. 2 is an end elevation of the bushing;

Fig. 3 is a longitudinal section of the bushing seated in a bore, the view showing an expansion tool ready for application;

Fig. 4 is a view similar to Fig. 3 taken at the end of the expansion operation;

Fig. 5 is a longitudinal sectional view showing a screw threaded into the expanded insert;

Fig. 6 is a side elevation of the tool employed in Fig. 3;

Fig. 7 is a sectional view of a second form of tool that may be employed in the practice of the invention;

Fig. 8 is a sectional view of an expanded tubular insert designed to function as a stud;

Fig. 9 is a sectional view of a tubular insert in the form of a spindle for a roller;

Fig. 10 is a sectional view of an expanded insert serving as a smooth-wall liner for a bore hole;

Fig. 11 is a sectional view of a bore hole liner of larger diameter, the view showing an impact tool in position for expanding the inner end of the liner;

Fig. 12 is a similar view showing a spinning tool disposed to expand the inner end of the liner;

Fig. 13 is a side elevation of another form of my insert;

Fig. 14 is an end view of the same insert; and

Fig. 15 is a sectional view of an expanded insert with the expanding tool permanently seated therein.

The tubular member or insert bushing generally designated 10 in Figs 1 and 2 is designed to seat in a bore 11 of a body 12 (Fig. 3). The body 12 may be, for example, a light casting of aluminum or magnesium alloy to which various connections are to be made in a fabrication procedure.

The tubular member 10 has a main or outer portion 15 of relatively large outside and inside diameters that is adapted to receive retaining members for various purposes. In the particular construction shown in the drawings the inner wall of the portion 15 is formed with screw threads 16 for engagement with the external screw threads 17 of a cap screw 18. Fig. 5 shows the cap screw serving as a connecting or retaining member for anchoring to the body 12 some accessory or other object 19. Preferably the tubular member has a rim flange 20 to provide a hard bearing surface for the object 19, and, as shown in the drawings, this rim flange may lie flush with the surface of the body 12.

The tubular member 10 also has an inwardly converging inner portion 21 that is deformable or expansible for engagement with the material of the body 12 around the bore 11. In the present form of my invention it is contemplated that the inner portion 21 of the tubular member will be caused to expand by the application of a tool in the form of a wedging means applied through the main portion 15 of the tubular member. Since I prefer to use a wedging means having fixed dimensions, I restrict the internal diameter of the inner portion 21 to permit a wedging tool of fixed dimensions to be effective for the required expansion operation. I also prefer to have the outer diameter of the inner portion 21 initially of restricted diameter. The drawings show the circular wall of the tubular member 10 progressively restricted in internal and external diameter at the inner end of the tubular member.

My purpose in restricting the outer diameter of the inner portion 21 of the tubular member is to permit integral external teeth or spurs 22 to be formed on the outside of the converging inner end portion 21 of the tubular member within the diameter of the bore 11 and furthermore to permit expansion of the portion 21 to drive the spurs 22 into the walls of the bore 11. Preferably, the inner end of the tubular member 10 is cut by longitudinal slots 25 forming tongues 26, each tongue carrying one of the teeth or spurs 22 on its outer side and having on its inner side a camming surface 27 which converges toward the axis of the tubular member.

Such a tubular member or insert bushing may be machined from a cylindrical block of suitable deformable metal, the block being cut away at the inner end to provide the restricted external diameter at the inner end of the insert and to form the aforementioned teeth 22. As best shown in Fig. 1, a circumferential groove may be cut in the insert to form rearwardly directed anchoring shoulders 14 or heel portions for the tongues 26 and the teeth 22. These shoulders or heels 14 are formed approximately at right angles to the converging tongues 26, though there is perhaps a few degrees of leeway on either side of such disposition. The spurs 22 have side surfaces 22a of substantial area which converge, in a plane transversely of the insert, to a biting apex, preferably in the form of a biting edge 22b extending longitudinally of the central axis of the insert.

A spreader tool generally designated 28 for expanding the tubular member 10 in the bore 11 may, as shown in Fig. 3, comprise a pin 29 with a tapered spreader-nose 30, the spreader-nose being smaller in diameter than the main or outer portion 15 of the tubular member but being larger in diameter than the inner diameter of the inner portion 21 of the tubular member. If such a pin is forced into the tubular member 10, the spreader-nose 30 will act as a conical wedge to deform or spread the tongues 26 and thereby cause the teeth 22 and portions of the tongues 26 to penetrate the bore walls. Preferably, the pin 29 is provided with a head 31 in the form of an anvil suitable for impact by a hammer, and it is contemplated that the head 31 will present a shoulder or flange 32 substantially larger in diameter than the inner diameter of the tubular member to serve as a stop to limit the extent to which the pin 29 may be driven into the tubular member. A cross handle 33 is added for convenience in retracting the tool. It is apparent that such a headed expansion tool may be designed to accomplish any desired predetermined expansion effect when driven to maximum into the tubular member.

In the preferred practice of my invention, the bore 11 is of a diameter to permit a snug but sliding fit of the tubular member 10. The bore may be substantially longer than the tubular member or may be just long enough to accommodate the length of the tubular member. The periphery of the tubular member 10 may be knurled, threaded, scored or otherwise serrated to favor engagement with the surrounding material of the body 12. In Fig. 1, for example, the tubular member is formed with longitudinal serrations 34. After the tubular member 10 is inserted in the bore 11, the spreader tool 28 is inserted to the operating position shown in Fig. 3 and is then driven by hammer blows to the maximum position shown in Fig. 4. In the particular arrangement shown in the drawings, the spreader tool 28 cannot be driven beyond the range of wedging action on the part of the spreader-nose 30 because of the shoulder 32, and, therefore, the spreader tool is readily retractible from the tubular insert at the end of the expansion operation. In any event, the cross handle 33 of the tool head 31 may be readily grasped for retraction of the tool, if necessary. It will be noted that the rim flange 20 of the tubular member not only limits inward movement of the tubular member under hammer blows but also prevents the driven tool from damaging the body 12.

If the tubular member 10 is made of suitable material that will flex without breaking in response to the wedging action of the spreader tool, and if the material will maintain the deformed configuration permanently to an extent preventing release of the member 10, the described application of the spreader tool is sufficient to make the tubular member permanently unitary with the body 12. In the preferred practice of my invention, the application of the spreader tool 30 completes the installation of the insert, and the insert is then ready for engagement by a screw or other retaining means in the manner indicated in Fig. 5. The positive engagement of the teeth 22 and the tongues 26 with the material of the body 12 not only anchors the tubular member 10 against longitudinal withdrawal but also anchors the tubular member against rotation so that the tubular member remains fixed while the cap screw 18 is being threaded into final disposition.

In the practices of the invention discussed above, the insert bushing or tubular member 10 is engaged with the surrounding body 12 with exceptional efficiency. The exceptional efficiency is attributable largely to the fact that my invention permits the application of exceptionally high expansion forces. The spreader tool 28 under the impact of a hammer will transmit more force to the inner end of the tubular member than can be transmitted by any spreader means driven by screw threads. The engagement efficiency afforded by the preferred form of the invention is also attributable to the fact that the expansion of the inner end of the tubular insert tends to draw the insert into the bore against the resistance of the rim flange 20 of the insert. The axially directed force of the spreading tool initially forces the insert axially inward, and then the teeth 22 in penetrating the material of the surrounding body 12 move in a manner to pull inward and place the insert under tension. Sufficient tension remains after the tool is withdrawn to preclude any movement of the insert relative to the surrounding body, the insert being permanently clinched in place. In this aspect of the invention it is to be noted that the engagement shoulders 14 at the base portions of the teeth and tongues are moved into the material of the surrounding body in a manner tending to draw the insert inward. It is also to be noted that the teeth are tapered in transverse cross section to penetrate the surrounding material with transverse wedging action and that the shoulders 14 give the tongues 26 tapered configuration in longitudinal cross section for what may be termed longitudinal wedging action, the two wedging actions resulting in highly efficient engagement with the body 12.

In various practices of my invention the device, such as the spreader tool 28 for expanding the inner end of the tubular insert, may be rotated or spun about its longitudinal axis and at the same time subjected either to a steady longitudinal thrust or to hammer blows to facilitate the spreading operation. Various advantages are achieved by spinning the expanding tool. One of these advantages is that rotating of the spreader-nose 30 gives the internal cam surfaces 27 of the tubular inserts polished surfaces to facilitate withdrawal of the tool. Other advantages arise from heat by friction when the tool is spun under longitudinal pressure. The increased temperature of the inner end of the tubular insert causes the metal to be displaced or deformed more readily and the increased temperature also causes reduction of strain and favors permanent setting of the metal at the expanded or deformed configuration.

For an effective spinning action, in anchoring the tubular member 10 in the bore 11 I may employ a spinner tool constructed as indicated in Fig. 7 instead of the previously described tool shown in Fig. 6. The spinner tool generally designated 42 in Fig. 7 has a body 44 with a handle portion 45. Mounted in the body 44 and extending forward therefrom is a driven shaft 46 that rotates in a forward bearing 47 and in a rearward thrust bearing 48. On the forward end of the driven shaft 46 is a suitable chuck 50 for releasably holding a spreader pin 51 having a spreader-nose 52, corresponding respectively to the pin 29 and spreader-nose 30 of the previously described tool 28.

Any suitable mechanism may be employed to actuate the driven shaft 46. In the particular arrangement shown, a flexible drive shaft 53 having a flexible casing 55 terminates in a beveled gear 56 inside the handle 45. A countershaft 57 inside the tool body 44 carries a beveled gear 58 in mesh with the beveled gear 56 and also carries a small pulley 60. The pulley 60 is operatively connected to a pulley 61 on the driven shaft 46 by a suitable belt 62.

With the driven shaft 46 rotating at substantial speed, the operator applies the tool 42 to an unexpanded tubular member 10 by simply inserting the tool axially into the tubular member and either exerts steady pressure against the tool or applies a suitable hammer against an anvil portion 63 of the tool body 44 to cause the required expanding action. Preferably the spreader pin 51 has an annular shoulder or flange 65 to serve the same purpose as the shoulder 32 of the first described spreader tool.

The tubular inserts shown in Figs. 8 and 9 are similar to the previously described tubular member 10 in having slotted inner portions 21 of initially restricted internal diameter, the inner portions providing the usual deformable tongues 26 carrying teeth 22. Each of the devices shown in Figs. 8 and 9 may be anchored in a body bore 11 by using either the impact tool of Fig. 6 or the spinning tool of Fig. 7.

The tubular member generally designated 70 in Fig. 8 has an axial bore 71 and is provided with a radial flange 72 to limit the extent to which the tubular member is inserted in the bore 11 of the body 12. The tubular member 70 is designed to serve as a threaded stud on the body 12 and is formed therefore with an externally threaded axial extension 73.

Fig. 9 shows a tubular member or insert 80 formed with a threaded axial bore 81 and a smooth axial extension 83 to serve as a stud or spindle for rotary means such as a roller 85. The tubular insert 80 has a relatively thick radial flange 86 to serve as a spacer for the roller 85. The roller 85 is mounted on a journal sleeve 87 and is retained by the head 88 of a suitable screw 90 that is threaded into the bore 81.

Fig. 10 shows a tubular insert 92 having a smooth axial bore 93 and a rim flange 95, the purpose of the tubular insert being, for example, to provide a smooth lining for a bore 11 in the body 12, the lining being dimensioned to receive a centering pin or other member.

Figs. 11 and 12 show a tubular insert 100 of relatively large diameter to serve as a liner for a relatively large bore 101 in the body 12. The tubular member 100 has the usual rim flange 102 and has an inner portion 103 of initially restricted internal diameter, the inner portion 103 being deformable to permit teeth 105 thereon to be driven into the surrounding material of the body 12. Fig. 11 shows the operating inner end of a spreader tool 106 that may be employed to expand and anchor the tubular member 100 in the bore 101. This spreader tool 106 is similar to the first-described spreader tool 28 but has a relatively large spreader-nose 107, as required by the relatively large diameter of the tubular member 100.

Fig. 12 indicates how a spinning tool may be employed to expand the inner end 103 of the tubular insert 100. The spinner tool of Fig. 12 comprises a rotary tool assembly 110 having a shank 111 adapted to be mounted in the previously-mentioned chuck 50 of the spinner tool 42. Integral with the shank 111 and concentric thereto is an enlarged cylindrical portion 112 that has at its forward end an eccentric extension or stud 113 for a metal-working roller 115. The roller 115 is carried in a circular orbit and has a profile suitable for rolling action and crowding action to expand the inner end 103 of the tubular member 100. Two roller bearings 116 embracing the cylindrical portion 112 rotatably carry a guide sleeve 117 which is dimensioned to slide snugly into the tubular member 100, the purpose of the sleeve being to serve as guide means for holding the tool assembly 110 concentric to the tubular insert.

In the attached claims, when I refer to a body having a bore or providing a bore of substantially uniform diameter, I have reference to a bore which is of substantially the same internal dimension throughout that portion of its length occupied by the tubular insert, without reference to incidental variations in diameter, such as might be present due to marks formed by the boring tool, or minor indentations caused by knurling, roughening, or threading the bore. When speaking of a tubular member of such initial external diameter as to be insertable in such a bore, I have reference to a tubular member which fits relatively tightly in the bore, whether pushed longitudinally therein by manually-applied or machine-applied force, or whether rotated during forward advancement into the bore, as, for example, by turning a smooth-periphery, or threaded-periphery, or knurled-periphery tubular member during the time that it is initially being disposed in the bore.

The tubular member or insert 120 shown in Figs. 13 and 14 is relatively short but similar in general configuration to the first described tubular member 10. It has a rim flange 121 and a tapered nose 122 cut to form tongues 123 with integral teeth 125. An important feature of this embodiment is that the teeth 125 are of sturdy design to penetrate relatively tough material, each tooth being pyramidal in form rather than blade-like. It will be noted that each tooth has a rearwardly directed face 127 that may serve much the same function as the shoulders 14 of the first-described insert 10, and also has side surfaces 128 converging to a longitudinal biting edge 129.

Fig. 15 shows a tubular member or insert generally designated 128 that is similar to the previously described tubular member 10 of Figs. 1 to 5, corresponding numerals being employed to designate corresponding parts. The tubular member 128 differs from the tubular member 10 in having external threads 129 to engage corresponding threads in the material of the surrounding body 12. In the practice of the invention exemplified by Fig. 15, however, the external threads 129 may be omitted in which event the external surface of the tubular member 128 may be knurled, scored, or otherwise serrated, as by longitudinal serrations, as previously described with reference to the tubular member or insert 10.

The tubular member 128 is shown in combination with a special spreader member or tool 130 that is intended to be permanently seated in the tubular member. The spreader tool 130 has a conical nose 131 for spreading action and a cylindrical portion 132 that serves in a positive manner to hold the tongues 26 spread apart with the teeth 22 embedded in the surrounding body 12. The spreader tool 130 has a head 133 of a diameter to slidingly pass through the internal screw thread 16 of the tubular member 128. The head provides a shoulder 134 to serve as a stop to limit inward movement of the spreader member, the shoulder being blocked by the restricted inner end of the tubular member 128.

To carry out the procedure represented by Fig. 15 the tubular member 128 is screw-threadedly introduced into the bore 11 of the body 12, the bore being sufficiently restricted to permit the external threads 129 of the tubular member to make positive engagement with the material of the body 12. After the tubular member 128 is threaded into the bore 11 the spreader tool or member 130 is introduced and driven home, for example, by the use of a hammer against a short rod 135 or by the use of an air hammer of which the rod 135 is a part. The various parts are then in the positions shown in Fig. 15. The rod 135 is thereafter withdrawn to permit suitable anchoring or retaining means such as the cap screw 18 of Fig. 5 to be threaded into the tubular member 128. If it is not desired to provide space for utilization of such anchoring or retaining means, the head 133 may be made longer, even to such length as to be flush with or extend beyond the end of the tubular member 128. It will be noted that the external threads 129 of the tubular member 128, as well as the teeth 22, prevent axial retraction of the tubular member and that the teeth 22 additionally serve to keep the tubular member from being unscrewed from the bore 11.

In the embodiment of the invention shown in Fig. 15, that portion of the tubular member forming the arms which retain the teeth 22 will, in all instances, be sufficiently flexible to permit penetration of the body 12. The material of these arms may be such as to maintain the deformed configuration upon withdrawal of the spreader member 130. On the other hand, these arms may be of sufficient resiliency to return the teeth 22 to their preliminary position upon withdrawal of the spreader member 130 by any suitable means. By making these arms of sufficiently resilient material, the teeth 22 may return to a position within the confines of the bore 11 upon withdrawal of the spreader member 130, thus permitting the tubular member to be withdrawn from the bore 11 should this become desirable.

The various procedures and embodiments of my invention, described in specific detail for the purpose of this disclosure and to illustrate the principles involved, will suggest various departures under my inventive concept; I reserve the right to all such departures that come within the scope of my appended claims.

I claim as my invention:

1. Means for insertion in a cylindrical bore of substantially uniform diameter in a relatively soft body, comprising a tubular member of such initial external diameter as to be insertable in said bore and providing a central opening, said tubular member providing a body portion which is circumferentially integral and of such external diameter as to fit snugly in said bore, said tubular member having an expansible longitudinally split inner end portion of reduced external diameter formed with external outwardly projecting spurs initially within the confines of said initial external diameter, said spurs each having a thin biting edge extending longitudinally of the axis of said tubular member and a heel portion facing substantially toward the outer end of the tubular member, and said inner end portion being formed internally with sloping cam surfaces converging inward toward the axis of said central opening to be in the locus of forward motion of a spreader element insertable through said central opening to expand said split end portion in a manner to force said spurs to bite into said relatively soft body.

2. Means for insertion in a cylindrical bore of substantially uniform diameter in a relatively soft body, comprising a tubular member of such initial external diameter as to be insertable in said bore and providing a central opening, said tubular member providing a body portion which is circumferentially integral and of such external diameter as to fit snugly in said bore, said tubular member having an expansible longitudinally split inner end portion of reduced external diameter formed with external outwardly projecting spurs initially within the confines of said initial external diameter, said spurs each having side surfaces of substantial area converging in a plane transversely of said tubular member to a biting apex and a heel portion outwardly of said biting apex providing a surface facing substantially toward the outer end of the tubular member, and said inner end portion being formed internally with sloping cam surfaces converging inward toward the axis of said central opening to be in the locus of forward motion of a spreader element insertable through said central opening to expand said split end portion in a manner to force said spurs to bite into said relatively soft body.

3. An insert adapted to be anchored in a bore of a body formed of relatively soft material, comprising: a circumferentially integral tubular body adapted to be received snugly within said bore, a plurality of tongues extending inwardly of the bore from said tubular body, said tongues having outer surfaces converging toward the axis of said tubular body, whereby to define an external tapering clearance space between said outer surfaces and said bore, and single spurs formed integrally with said tongues and projecting radially outwardly from the outer surfaces of the tongues at the end portions thereof, said spurs initially projecting outwardly from the tongues no further than the external surface of said tubular body, said spurs each having side surfaces of substantial area converging in a plane transversely of said tubular body to a biting apex and a heel portion providing a surface facing substantially outwardly of the bore, said tongues being expansible to move said spurs radially outwardly beyond the external surface of said body and to force said spurs into biting engagement with said body of relatively soft material.

4. An insert adapted to be anchored in a bore of a body formed of relatively soft material, comprising: a circumferentially integral tubular body adapted to be received snugly within said bore, a plurality of tongues extending inwardly of the bore from said tubular body, said tongues having outer surfaces converging toward the axis of said tubular body, whereby to define an external tapering clearance space between said outer surfaces and said bore, and single spurs formed integrally with said tongues and projecting radially outwardly from the outer surfaces of the tongues at the end portions thereof, said spurs initially projecting outwardly from the tongues no further than the external surface of said tubular body, said spurs each having side surfaces of substantial area converging in a plane transversely of said tubular body to a biting edge that extends in a direction longitudinally of the tubular body and a heel portion providing a surface facing substantially outwardly of the bore, said tongues being expansible to move said spurs radially outwardly beyond the external surface of said body and to force said spurs into biting engagement with said body of relatively soft material.

5. An insert adapted to be anchored in a bore of a body formed of relatively soft material, comprising: a circumferentially integral tubular body adapted to be received snugly within said bore, a plurality of tongues extending inwardly of the bore from said tubular body, said tongues having inner and outer surfaces converging toward the axis of said tubular body, whereby to define an internal conical cavity and an external tapering clearance space between said outer surfaces and said bore, and single spurs formed integrally with said tongues and projecting radially outwardly from the outer surfaces of the tongues at the end portions thereof, said spurs initially projecting outwardly from the tongues no further than the external surface of said tubular body, said spurs each having side surfaces of substantial area converging in a plane transversely of said tubular body to a biting apex and a heel portion providing a surface facing substantially outwardly of the bore, said tongues being expansible to move said spurs radially outwardly beyond the external surface of said body and to force said spurs into biting engagement with said body of relatively soft material.

6. A combination of the character described, comprising: a tubular insert adapted to be anchored in a bore in a body of relatively soft material, said tubular insert including a tubular internally threaded outer body portion adapted for snug reception in said bore and a longitudinally split, expansible inner portion of lesser outside diameter than said bore and provided with internal wedge surfaces and external anchoring spurs, and an expander member comprising a pin externally dimensioned for reception within said tubular internally threaded body portion and adapted to be driven against and between said internal wedge surfaces to expand said split inner portion of said insert and cause said spurs to bite into the surrounding material of said relatively soft body, said pin being substantially shorter than said tubular member to leave exposed a substantial portion of said internal threads when the tubular member is driven home, whereby threaded means may be threaded into the tubular member after the tubular member is expanded and while the spreader member is in place, and there being engageable stop shoulders on said pin and in said tubular insert for limiting inward movement of said pin within said insert after the insert is expanded.

7. A combination of the character described, comprising: a tubular insert adapted to be anchored in a bore in a body of relatively soft material, said tubular insert including a tubular internally threaded outer body portion adapted for snug reception in said bore and a longitudinally split, expansible inner portion of lesser outside diameter than said bore and provided with internal wedge surfaces and external anchoring spurs, and an expander member comprising a pin externally dimensioned for reception within said tubular internally threaded body portion and adapted to be driven against and between said internal wedge surfaces to expand said split inner portion of said insert and cause said spurs to bite into the surrounding material of said relatively soft body, said pin being substantially shorter than said tubular member to leave exposed a substantial portion of said internal threads when the tubular member is driven home, whereby threaded means may be threaded into the tubular member after the tubular member is expanded and while the spreader member is in place.

JOSEPH ROSAN.